United States Patent [19]

Haight et al.

[11] 4,411,345
[45] Oct. 25, 1983

[54] CLUTCH MODULATING SYSTEM

[75] Inventors: Robert E. Haight, Waterloo; Kendall D. Tjepkes, Cedar Falls, both of Iowa

[73] Assignee: Deere & Company, Moline, Ill.

[21] Appl. No.: 227,730

[22] Filed: Jan. 23, 1981

[51] Int. Cl.³ .................. F16D 67/04; F16D 25/00; F15B 11/10
[52] U.S. Cl. .................................. 192/12 C; 74/11; 91/426; 91/451; 137/596.2; 192/109 F
[58] Field of Search ............... 192/12 C, 17 A, 18 A, 192/109 F; 74/11; 180/53 D; 91/426, 451; 137/596.2

[56] References Cited

U.S. PATENT DOCUMENTS

| 2,782,802 | 2/1957 | Sassen | 91/426 X |
|---|---|---|---|
| 2,935,999 | 5/1960 | Hock et al. | 192/109 F X |
| 3,215,236 | 11/1965 | Pensa | 192/109 F X |
| 4,000,795 | 1/1977 | Patton | 192/109 F |
| 4,083,382 | 4/1978 | Khatti | 192/4 A X |
| 4,235,415 | 11/1980 | Heckenkamp | 91/426 X |

FOREIGN PATENT DOCUMENTS

| 543023 | 9/1959 | Belgium | 192/109 F |
|---|---|---|---|
| 993102 | 5/1965 | United Kingdom | 192/109 F |

Primary Examiner—Allan D. Herrmann
Attorney, Agent, or Firm—Fraser and Bogucki

[57] ABSTRACT

In an agricultural vehicle in which a power takeoff modulating valve is shifted in response to a control lever so as to pass pressurized hydraulic fluid through a groove in the outer surface thereof between recesses in an adjacent bore wall for application to a power takeoff clutch to cause engagement of the clutch, application of the hydraulic fluid pressure to the clutch is modulated by an arrangement which selectively diverts the pressurized hydraulic fluid away from the clutch and to a sump in accordance with the rate of pressure increase of the hydraulic fluid to prevent excessively rapid engagement of the clutch. The hydraulic fluid is sumped by a trimmer valve having a first end which immediately responds to high fluid pressures by sliding into a position which sumps the conduit supplying hydraulic fluid to the clutch by an amount directly related to the pressure. An opposite second end of the trimmer valve also responds to the pressure of the hydraulic fluid but much more slowly because of a restriction in the conduit coupling the second end to the hydraulic fluid supply conduit. As sufficient hydraulic fluid passes through the restriction so as to equalize the fluid pressure at the opposite ends of the trimmer valve, the trimmer valve is returned to a position in which the sump is cut off and the hydraulic fluid pressure is applied to the power takeoff clutch.

11 Claims, 4 Drawing Figures

CLUTCH MODULATING SYSTEM

BACKGROUND OF THE INVENTION

1. Field of the Invention

The present invention relates to clutch modulating systems, and more particularly to a system for providing modulating control of a power takeoff clutch in an agricultural vehicle.

2. History of the Prior Art

A power takeoff shaft has been a conventional item on certain agricultural vehicles such as tractors for many years. The power takeoff shaft provides a means for coupling the engine of the tractor to drive agricultural implements being towed by or otherwise coupled to the tractor. The power takeoff shaft is typically coupled to the tractor engine through a clutch which controls the application of engine power to the shaft and thereby to the agricultural implements. On some tractors a separate brake may be provided for locking out rotation of the power takeoff shaft simultaneously with disengagement of the clutch.

An example of a tractor transmission system which includes a hydraulically operated power takeoff clutch and a hydraulically operated power takeoff brake is provided by U.S. Pat. No. 4,318,305 of Peter D. Wetrich et al, issued Mar. 9, 1982 and commonly assigned with the present application. The system described in the Wetrich et al patent requires the presence of pressurized hydraulic fluid to maintain engagement of the power takeoff clutch. Upon loss of hydraulic fluid pressure, either intentionally through manipulation of the power takeoff control lever or by accident such as in the case of hydraulic leak or failure, the power takeoff clutch becomes disengaged and a power takeoff brake simultaneously becomes actuated so as to lock the power takeoff shaft to the transmission housing to prevent rotation of the shaft. The automatic disengagement of the power takeoff clutch upon loss of hydraulic fluid pressure is a desirable safety feature. The resulting uncoupling of the agricultural implements from the tractor engine in the event the tractor stalls or the engine is intentionally turned off insures that upon restarting an attached implement does not immediately begin operating so as to injure the operator or another who may be close to or working on the implement. The operator is required to move the power takeoff control lever into the engaged position each time the tractor is started before the implements attached to the power takeoff shaft can be operated.

When operating tractors of various types including those having a transmission system like that shown in the Wetrich et al patent, it is desirable to be able to move the power takeoff control lever quickly into the engage position. This is particularly true during operations where the operator is busy with other controls. At the same time rapid movement of the power takeoff control lever into the engage position may result in excessively rapid engagement of the power takeoff clutch, resulting in damage to the clutch or to the implements coupled to the power takeoff shaft. Accordingly, it would be desirable to be able to move the power takeoff control lever into the engage position very quickly without danger of damage to either the tractor or the implements being driven by the power takeoff shaft.

At the same time it is desirable to be able to manually modulate the power takeoff control lever so as to vary the extent of engagement of the power takeoff clutch. Many types of agricultural operations require some coupling of the power takeoff shaft to the tractor engine which is less than total engagement. Nevertheless, many tractors feature only an on-off type of control in which the power takeoff shaft is either positively coupled to or is uncoupled from the tractor engine.

Another feature which is desirable with the power takeoff portion of a tractor is the ability to deliver shocks to the power takeoff drive line when necessary. Occasionally the implements being driven by the power takeoff shaft may become clogged or stalled or otherwise temporarily immobilized. In such situations the delivery of shocks to the power takeoff drive line will frequently aid in untangling such implements. However, such feature is in contradiction to the more prevalent desire to provide for gradual engagement of the power takeoff clutch so as to prevent excessively rapid engagement of such clutch during most operating conditions.

The prior art includes various examples of systems which vary the application of pressurized fluid to a clutch, transmission or similar device. Such examples include those provided by U.S. Pat. Nos. 3,722,646, 3,468,194, 4,093,051, 3,603,344, 3,348,644, 3,438,469 and 3,352,392. Still other examples utilizing valves and other devices to provide a desired delaying action in the operation of clutches, transmissions and similar devices include U.S. Pat. Nos. 2,807,968, 2,939,557, 3,656,600, 3,670,599, 3,674,121, 3,707,891, 3,709,065, 3,882,980, 3,972,401, 3,990,553, 4,000,795, 3,085,834, 4,096,882, 4,150,737, 3,621,955, 3,850,273, 3,863,523, 3,998,111 and 4,111,071.

None of the patents noted above provide a system comprising the various desirable features previously noted. Thus, such systems do not provide a modulating system well suited for controlling a power takeoff clutch or similar arrangement in which the degree of clutch engagement can be effectively modulated while at the same time enabling the control lever to be quickly moved into the engage position without danger of damage to the system. Additional desirable features in combination therewith which are not shown or suggested by the art noted above include the automatic disengagement of the clutch upon loss of hydraulic fluid pressure and the ability to apply controlled shock loads to the drive line in combination with the other features.

BRIEF DESCRIPTION OF THE INVENTION

Clutch modulating systems in accordance with the invention accomplish the desired features noted above by utilizing an arrangement which sumps selected amounts of pressurized hydraulic fluid being applied to a clutch in accordance with the rate of pressure rise of the hydraulic fluid. A trimmer valve responds immediately to the hydraulic fluid pressure so as to couple the conduit carrying the hydraulic fluid to a sump by an amount dependent upon the rate of fluid pressure rise. At the same time, the hydraulic fluid is applied to an opposite end of the trimmer valve via a flow restriction which slows the application of the fluid to the other end long enough for the sumping action to take place. As the hydraulic fluid passes through the flow restriction so as to increase the pressure at the other end of the trimmer valve and eventually equalize the pressure at the opposite ends of the valve, the valve gradually changes position so as to decrease the communication between the hydraulic fluid conduit and the sump to a point where the sump is eventually cut off and all of the fluid pressure is applied to the clutch.

The action of the trimmer valve slows the application of hydraulic fluid pressure to the clutch enough so that even instantaneous movement of a clutch engagement control lever into the engage position would not result in excessively rapid engagement of the clutch so as to pose a danger of damage to the clutch or to components coupled thereto.

In a preferred arrangement of the invention adapted for use with a power takeoff clutch and control lever, the control lever is coupled to adjust the position of a power takeoff modulating valve which controls the application of hydraulic fluid pressure to the clutch. Movement of the control lever into or toward the engage position adjusts the position of the modulating valve so as to couple a source of pressurized hydraulic fluid via recesses in the bore wall of the modulating valve and an intervening groove in the valve itself to the main conduit which is coupled to the clutch. The main conduit is also coupled to the trimmer valve so as to divert some or all of the hydraulic fluid pressure to the sump associated with the trimmer valve as a function of the rate of fluid pressure rise.

Operation of the control lever is integrated with a lock position by a conduit coupling the modulating valve to an end of the lock piston opposite an end of the piston engaged by a crank rotated by the control lever. As the crank is rotated in response to movement of the control lever, a corresponding amount of the hydraulic fluid pressure from the source therefor is applied by the modulating valve to the end of the lock piston to keep the piston engaged against the crank and thereby provide a detent for the control lever.

The clutch itself is preferably of the type which automatically disengages upon loss of hydraulic fluid pressure, either intentionally or by accident. In the preferred arrangement the power takeoff shaft is locked to the system housing simultaneously with disengagement of the clutch by terminating the application of hydraulic fluid pressure to a brake. The modulating valve applies hydraulic fluid pressure to the brake prior to the application of such fluid pressure to the clutch so as to maintain the brake in a released condition during partial or complete engagement of the clutch.

The trimmer valve comprises a pair of pistons mounted within concentric bores of different diameter and held in spaced-apart relation by a coil spring and a pin disposed within the spring. The main hydraulic fluid conduit from the modulating valve to the clutch is also coupled to the end of the smaller bore adjacent a first one of the pistons. When a rapid increase in fluid pressure first occurs in the main conduit, the first piston is moved toward the second piston against the resistance of the spring so as to uncover and allow a recess in the wall of the smaller bore coupled to a sump to communicate with the main conduit. Hydraulic fluid flowing through the flow restriction eventually reaches the larger bore adjacent the second piston where it causes the second piston to be moved toward the first piston against the resistance of the spring. Eventually, the second piston engages the pin within the spring and forces the pin into contact with the first piston. This forces the first piston toward the first end of the smaller bore so as to cut off communication between the sump and the hydraulic fluid conduit. When the first piston is returned to its original position, the sump is completely cut off from the hydraulic fluid line, and all of the hydraulic fluid pressure is applied to the clutch to provide engagement thereof.

Momentary shock loads of desired magnitude can be applied to the power takeoff shaft by quick movement of the control lever out of and then back toward the engage position. When this occurs, hydraulic fluid pressure to the clutch momentarily decreases and is then increased. Because the flow restriction prevents fluid pressure at the second piston from dissipating quickly, the trimmer valve is incapable of moving quickly so as to partially or completely sump the hydraulic fluid conduit, and all of the hydraulic fluid pressure is therefore applied directly to the clutch to provide the desired shock load.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
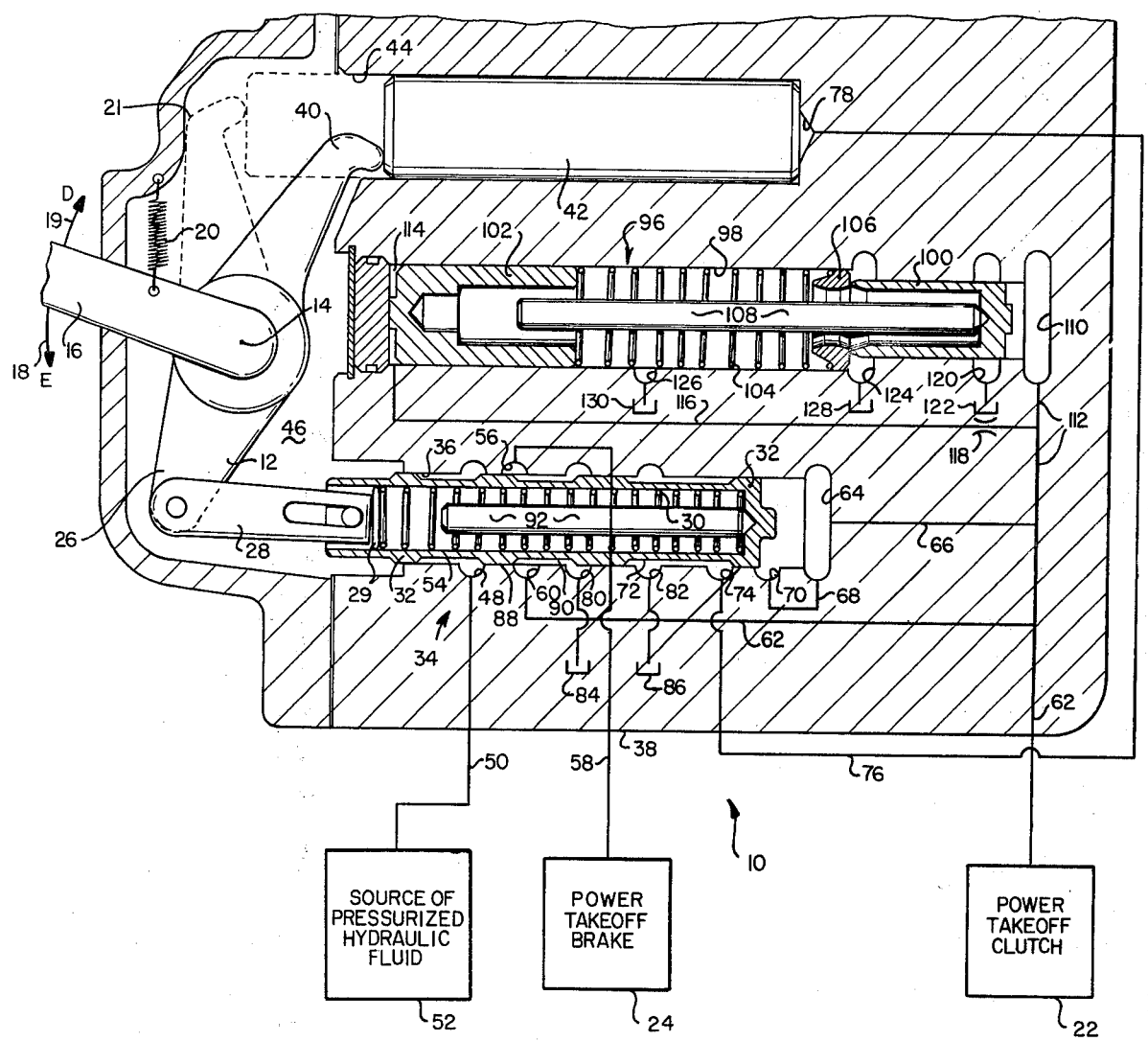
FIG. 1 is a sectional view of a clutch modulating system in accordance with the invention.

FIG. 1 depicts a clutch modulating system 10 in accordance with the invention. The system 10 of FIG. 1 is hereafter described in conjunction with its operation of a power takeoff (PTO) clutch and associated brake. However, it will be understood by those skilled in the art that the principles of the invention, while ideally suited to the particular control requirements of a power takeoff system, could be applied to other clutch operated arrangements as well.

The clutch modulating system 10 of FIG. 1 includes a crank 12 which is mounted for rotation about an axis 14. Rotation of the crank 12 about the axis 14 is controlled by a PTO control lever 16 which is coupled to the crank 12 in the region of the axis 14. As shown by a pair of arrows 18 and 19 the PTO control lever 16 is moved so as to rotate the crank 12 in a counterclockwise direction as viewed in FIG. 1 against the resistance of the spring 20 to provide clutch engagement and in a clockwise direction as viewed in FIG. 1 with the urging of the spring 20 to provide disengagement of the clutch. The crank 12 and the PTO control lever 16 are shown in the disengage position in FIG. 1. When the PTO control lever 16 is moved into the engage position, the crank 12 assumes a position shown by a dotted outline 21.

The clutch comprises a power takeoff clutch 22 which is shown as a block in FIG. 1 and which may comprise a clutch of the type described in the previously referred to application of Wetrich et al. The clutch 22 is associated with a power takeoff brake 24

FIG. 1, the groove 90 provides communication between the recesses 60 and 80 so that any hydraulic fluid pressure trapped in the main conduit 64 can be vented via the sump 84. In like fashion, movement of the piston 32 to the left positions the groove 72 so as to couple the recess 74 to the recess 82 and thereby allow hydraulic fluid in the conduit 76 to escape via the sump 86.

The modulating valve 34 has an elongated pin 92 generally concentrically disposed therein and inside of the coil spring 30. As the link 28 is moved to the right as viewed in FIG. 1 in response to counterclockwise rotation of the crank 12, the spring 30 is compressed by the washer 29 tending to move the piston 32 to the right as previously described. The pin 92 eventually has the lefthand end thereof engaged by the washer 29 and the righthand end thereof forced against the righthand end of the piston 32 to insure movement of the piston 32 into a position which will apply hydraulic fluid via the main conduit 62 to the power takeoff clutch 22 and also to the lock piston 42.

The arrangement described thus far provides for modulating control of the clutch 22 so that less than full engagement of the clutch 22 can be achieved where desired for certain operations. If the PTO control lever 16 is moved part but not all of the way into the engage position, the modulating valve 32 is moved part but not all of the way to the right as viewed in FIG. 1 so that the land 88 and the groove 54 combine to provide partial but not complete communication between the recesses 48 and 60. This applies hydraulic fluid under less than the full pressure of the source 52 to the clutch 22. Adjustment of the PTO control lever 16 to different positions within this range adjust the position of the modulating valve 34 so as to vary the pressure of the fluid applied to the clutch 22 accordingly. When the PTO control lever is moved all the way into the engage position, the valve 34 is moved all the way to the right as viewed in FIG. 1 and the full pressure of the hydraulic fluid source 52 is applied to the clutch 22.

When application of the hydraulic fluid pressure to the clutch 22 is terminated, either intentionally or by accident, the clutch 22 automatically disengages and the brake 24 is locked in place as previously described. This feature prevents the power takeoff shaft and any implements coupled thereto from being driven immediately upon startup of the tractor. It becomes necessary for the PTO control lever 16 to be moved into the engage position before the clutch 22 is engaged and the power takeoff shaft is driven.

Figure 2:
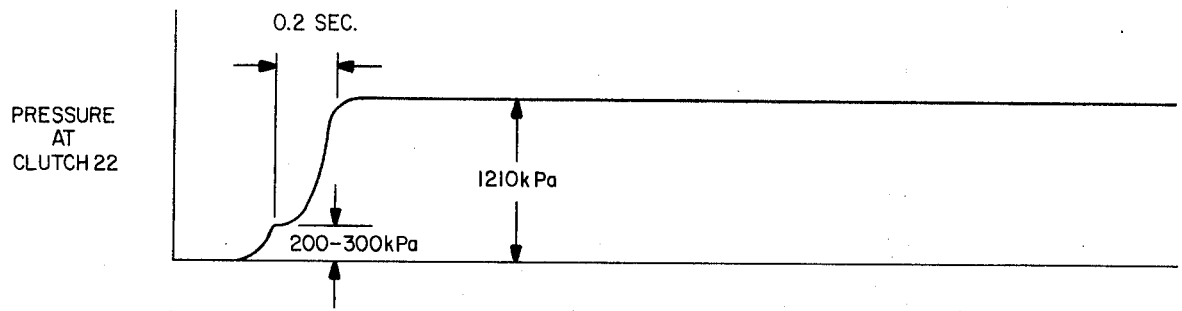
FIG. 2 is a diagrammatic plot of hydraulic fluid pressure in the clutch and in the brake as a function of time illustrating the case of rapid engagement without the benefit of the trimmer valve of FIG. 1.
Figure 2:
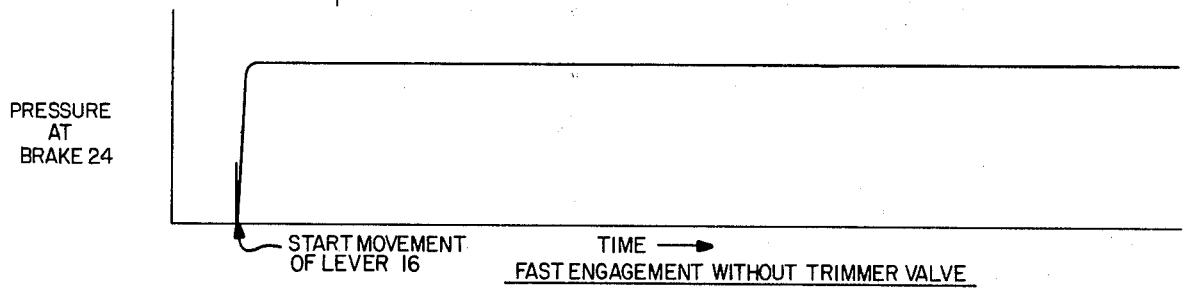

There are various types of operations performed by the tractor containing the clutch modulation system 10 which require repeated engagement and disengagement of the power takeoff clutch 22. If the PTO control lever in a conventional system is moved into the engage position too rapidly, the resulting rapid pressure rise in the hydraulic fluid at the clutch may shock the clutch and the power takeoff system to such an extent as to damage one or the other or both. At the same time gradual movement of the PTO control lever into the engage position is relatively time consuming and requires the attention of the operator when such attention should be directed to other activities. FIG. 2 comprises diagrammatic plots of the pressure of hydraulic fluid at the power takeoff clutch 22 and the brake 24 as a function of time when a trimmer valve 96 shown in FIG. 1 is absent. FIG. 2 depicts the condition in which the PTO control lever 16 is moved very rapidly from the disengage position into the engage position. It will be seen that when the control lever 16 is first moved into the engage position, the fluid pressure at the clutch 22 increases rather rapidly to about 200–300 kPa, following which it continues to increase, at first gradually as the hydraulic fluid fills the clutch 22 and then very rapidly, to a maximum value of approximately 1210 kPa over a period of about 0.2 seconds. The pressure of 1210 kPa is approximately equal to the pressure of the hydraulic fluid source 52. The initial pressure jump to about 200–300 kPa is due principally to the fact that the spring 30 within the modulating valve 34 compresses somewhat before the piston 32 begins to move. When movement of the piston 32 first begins, the amount of hydraulic fluid pressure applied via the groove 54 to the recess 60 increases rapidly to the 200–300 kPa value from which it continues to increase to the 1210 kPa value as the piston 32 continues to move to the right. The increase in hydraulic fluid pressure at the clutch 22 from 0 to 1210 kPa in a period of just over 0.2 seconds is rapid enough to pose a substantial danger of damage to the clutch 22 or to some other part of the power takeoff system.

As soon as the PTO control lever 16 is first moved toward the engage position, the resulting movement of the piston 32 to the right as viewed in FIG. 1 quickly applies part of and then all of the fluid pressure from the source 52 to the brake 24 via the groove 54, the recess 56 and the conduit 58. This provides for rapid release of the brake 24 as shown in FIG. 2 so that the brake 24 does not thereafter interfere with the operation of the clutch 22.

To prevent excessively rapid engagement of the clutch 22, the clutch modulating system 10 is provided with the trimmer valve 96. The trimmer valve 96 comprises an enclosed, generally cylindrical bore 98 within the housing 38 containing an opposite pair of pistons 100 and 102 slidably disposed adjacent the right and left ends of the bore 98 respectively as viewed in FIG. 1. The pistons 100 and 102 have different diameters and are disposed within two different concentrically oriented portions of the bore 98. A coil spring 104 disposed within the bore 98 extends between and contacts the piston 102 and a ring 106 engaging the end of the piston 100. An elongated pin 108 is generally concentrically disposed within the spring 104 and extends at least partially into the hollow interiors of the pistons 100 and 102. The length of the pin 108 is such that the pin 108 does not extend the entire distance between the insides of the pistons 100 and 102 when in the relative positions shown in FIG. 1.

The righthand end 110 of the bore 98 adjacent the piston 100 is coupled to the main conduit 62 by a conduit 112. The opposite lefthand end 114 of the bore 98 adjacent the piston 102 is coupled to the conduit 112 via a conduit 116 having a flow restriction of reduced diameter therein in the form of an orifice 118.

When hydraulic fluid pressure is applied to the power takeoff clutch 22 by the modulating valve 34, the pressurized fluid is simultaneously applied to the end 110 of the bore 98 via the conduit 112 and to the orifice 118. The orifice 118 prevents the full pressure of the fluid from being immediately applied to the end 114 of the bore 98 and to the piston 102 contained therein. However, the full fluid pressure is immediately applied to the end 110, and this results in the piston 100 being moved to the left as viewed in FIG. 1 so as to compress the spring 104. As the piston 100 moves to the left, communication is established between the end 110 and a recess which is also shown in block diagram form in FIG. 1 and which may comprise a power takeoff brake of the type described in the Wetrich et al application. The power takeoff clutch described in the Wetrich et al application is engaged by the application of hydraulic fluid to move a hollow, ring-shaped piston against the resistance of a coil spring and thereby compress a plurality of friction rings against a pressure ring and a stop ring. When application of pressurized hydraulic fluid is terminated, either intentionally or by accident, the coil spring returns the hollow, ring-shaped piston to a position which allows the friction, pressure and stop rings to separate. The power takeoff brake described in the Wetrich et al application also uses a ring-shaped piston to control engagement of a friction ring and a friction disk. Engagement of the ring and disk operates to brake the power takeoff shaft by slowing the shaft and then locking it to the transmission housing. In the present example it is assumed that the ring and disk are engaged by a spring to provide braking of the shaft with the application of hydraulic fluid pressure overcoming the spring to separate the ring and disk and release the shaft.

The crank 12 has a first end 26 thereof which is pivotally coupled to a link 28. An opposite end of the link 28 from the first end 26 of the crank 12 terminates in a washer 29 which engages a coil spring 30 mounted within a hollow piston 32 comprising a modulating valve 34. The piston 32 is slidably mounted within a generally cylindrical bore 36 within a housing 38 for the clutch modulating system 10. A second end 40 of the crank 12 opposite the first end 26 engages the end of a lock piston 42 slidably mounted within a generally cylindrical bore 44 within the housing 38. The ends of the bores 36 and 44 adjacent the crank 12 open into a common chamber 46 within the housing 38 in which the crank 12 is rotatably mounted. The PTO control lever 16 extends from the chamber 46 to the outside of the housing 38 to provide manual access thereto.

The wall of the bore 36 which receives the piston 32 of the modulating valve 34 is provided with a plurality of annular recesses therein which partly or completely surround the piston 32. Such recesses include a first recess 48 which is coupled via a conduit 50 to a source of pressurized hydraulic fluid 52. Hydraulic fluid from the source 52 flows under pressure through the conduit 50 to the recess 48 where it fills a groove 54 in the outer surface of the piston 32. The crank 12 and the piston 32 are shown in the disengaged position for the clutch 22 in FIG. 1. When it is desired to provide at least some engagement of the clutch 22, the PTO control lever 16 is rotated in the direction of the arrow 18. This results in the link 28 at first compressing the spring 30 and then eventually sliding the piston 32 to the right as viewed in FIG. 1. As the piston 32 moves to the right, the groove 54 therein eventually couples the recess 48 with its source of pressurized hydraulic fluid therein to a recess 56 coupled via a conduit 58 to the power takeoff brake 24. Communication between the recesses 48 and 56 applies the pressurized hydraulic fluid via the conduit 58 to release the brake 24.

Continued movement of the piston 32 to the right as seen in FIG. 1 eventually provides communication between the recess 48 and a recess 60 in the wall of the bore 36 via the groove 54. The recess 60 is coupled via a conduit 62 to the power takeoff clutch 22. The conduit 62 comprises the main conduit between the modulating valve 34 and the power takeoff clutch 22. Movement of the PTO control lever 16 toward the engage position eventually results in the pressurized hydraulic fluid being applied to the recess 60 and then to the power takeoff clutch 22 via the conduit 62 to provide engagement of the clutch 22.

The main conduit 62 is coupled to an end 64 of the bore 36 opposite the link 28 by a conduit 66. The end 64 is coupled via a short conduit 68 to an adjacent recess 70 in the wall of the bore 36. Accordingly, when the piston 32 is moved far enough to the right as viewed in FIG. 1 to apply pressurized hydraulic fluid through the recess 60 to the main conduit 62, the hydraulic fluid flows through the conduit 66 to the end 64 of the bore 36. At that point the end of the piston 32 adjacent the end 64 of the bore 36 has moved far enough to the right so as to cut off communication between the end 64 and the recess 70. However, the conduit 68 provides such communications so that the pressurized hydraulic fluid applied to the end 64 is applied to the recess 70 regardless of the position of the piston 32. The piston 32 includes a groove 72 in the outer surface thereof which couples the recess 70 to an adjacent recess 74 in the wall of the bore 36 whenever the piston 32 is moved far enough to the right to apply hydraulic fluid to the main conduit 62. This enables hydraulic fluid in the conduit 66 to flow through the conduit 68 to the recess 70 from which it flows along the groove 72 to the recess 74.

The recess 74 is coupled via a conduit 76 to apply the pressurized hydraulic fluid to the end of the lock piston 42 opposite the second end 40 of the crank 12. The conduit 76 is coupled to an end 78 of the bore 44 opposite the common chamber 46 of the housing 38. Application of pressurized hydraulic fluid to the end 78 of the bore 44 tends to push the lock piston 42 to the left as viewed in FIG. 1 so as to hold the piston 42 against the second end 40 of the crank 12. The movement of the PTO control lever 16 to the engage position as represented by the arrow 18 moves the piston to the right as seen in FIG. 1 and couples pressurized hydraulic fluid applied via the conduit 76 to the right end of the lock piston 42. This keeps the lock piston 42 engaged against the second end 40 of the crank 12 despite a substantial amount of rotation of the crank 12 in the counterclockwise direction as viewed in FIG. 1. If the PTO control lever 16 is now moved in the disengage direction as represented by the arrow 19 so as to tend to rotate the crank 12 in a clockwise direction as viewed in FIG. 1, the corresponding sliding movement of the lock piston 42 to the right is permitted by reduced hydraulic fluid pressure in the conduit 76 as the corresponding sliding movement of the piston 32 to the left causes the groove 72 therein to begin cutting off communication between the recesses 74 and 70. Operation of a lock piston such as the piston 42 in this manner is described in U.S. Pat. No. 3,731,706 of Michael, issued May 8, 1973 and commonly assigned with the present application. Such action provides the PTO control lever 16 with a desirable positive feel.

The wall of the bore 36 forming part of the modulating valve 34 contains two additional recesses 80 and 82 disposed between the recesses 60 and 74 and coupled to sumps 84 and 86 respectively. When the piston 32 has been moved to the right as viewed in FIG. 1 in response to movement of the PTO control lever 16 toward the engage position, the recess 80 is cut off from the adjacent recess 60 by a land 88 of the piston 32 between the groove 54 and a groove 90. When the PTO control lever is then rotated toward the disengage position so as to allow the piston 32 to slide to the left as viewed in 120 in the wall of the bore 98 adjacent the end 110. The recess 120 is coupled to a sump 122. With communication between the end 110 and the recess 120 established, the pressurized hydraulic fluid is applied substantially entirely to the sump 122 instead of to the power takeoff clutch 22.

Initially, upon application of hydraulic fluid pressure to the power takeoff clutch 22 by the modulating valve 34, the piston 100 is moved to the left so as to vent the pressurized hydraulic fluid to the sump 122 rather than allowing the fluid to flow to the clutch 22. This occurs because the orifice 118 prevents the full pressure of the hydraulic fluid from being immediately applied to the end 114 of the bore 98. In time, however, the orifice 118 communicates the pressurized hydraulic fluid to the end 114 so that the pressures at the opposite ends 110 and 114 of the bore 98 are substantially equal. As the pressure at the lefthand end 114 begins to increase, the piston 102 is gradually forced to the right as viewed in FIG. 1 so as to compress the spring 104. The spring 104 continues to be compressed in response to the rise in pressure at the end 114 until the pin 108 engages the insides of both pistons 100 and 102. When this occurs the piston 100 is forced to the right so as to slowly cut off the sump 122 from the end 110 of the bore 98. As the sump 122 is slowly cut off, more and more of the pressurized fluid is applied to the power takeoff clutch 22.

The trimmer valve 96 therefore responds to the rate of increase of hydraulic fluid pressure and varies the sumping of that pressure accordingly. When full or substantially full fluid pressure is quickly applied to the clutch 22, the trimmer valve 96 reacts by initially sumping substantially all of the pressurized fluid and then gradually applying more and more of the pressurized fluid to the clutch 22 on a controlled basis. On the other hand if the PTO control lever 16 is moved from the disengage position into the engage position rather slowly, the orifice 118 may be large enough to communicate the entire pressure to the left end 114 of the bore 98 immediately or relatively quickly so that the piston 100 provides very little or no sumping of the pressurized fluid.

Figure 3:
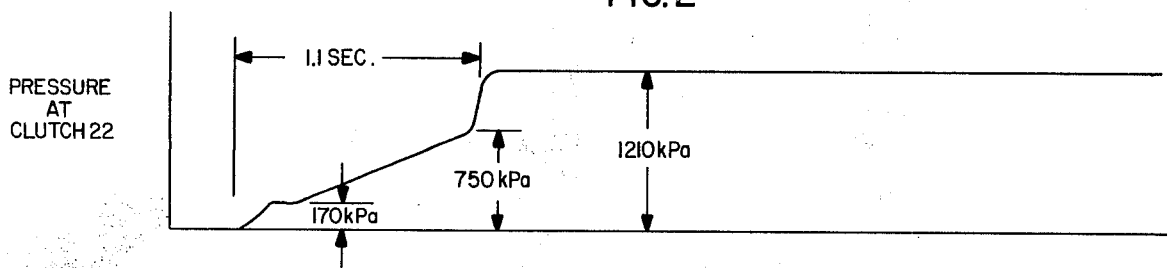
FIG. 3 is a diagrammatic plot of hydraulic fluid pressure in the clutch and in the brake as a function of time illustrating the case of rapid engagement with the benefit of the trimmer valve of FIG. 1.
Figure 3:
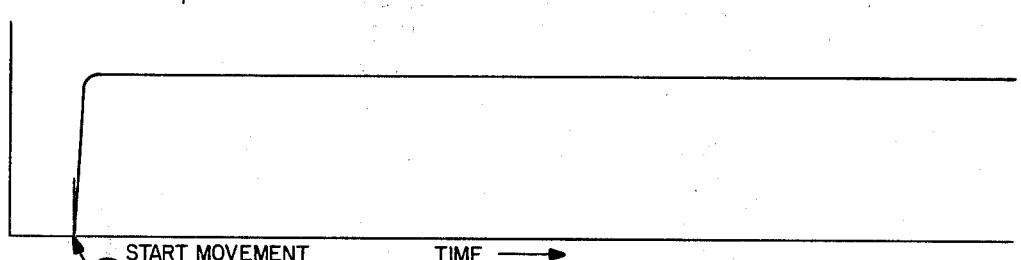

The manner in which the trimmer valve 96 responds to substantial pressure rises is depicted in FIG. 3 which comprises diagrammatic plots of hydraulic fluid pressure at the clutch 22 and the brake 24 as a function of time for quick movement of the PTO control lever 16 into the engage position. FIG. 3 assumes that the control lever 16 is moved into the engage position very rapidly as in the case in FIG. 2. It will be seen that the brake 24 releases rapidly as in the case of FIG. 2 so as not to interfere with operation of the clutch 22. It will also be seen that initially the fluid pressure at the clutch 22 increases very rapidly to a value of about 170 kPa from which it thereafter increases relatively gradually to a value of about 800 kPa over a time period of about 1.1 seconds. The pressure then increases rather rapidly to the pressure of the hydraulic fluid source 52 which is about 1210 kPa. The quick initial rise to 170 kPa is again due to the piston 32 within the modulating valve 34 beginning movement in response to compression of the spring 30. This action applies essentially full fluid pressure to the clutch 22 and to the end 110 of the trimmer valve 96. The trimmer valve 96 responds in the manner previously described to intially sump substantially all of the pressurized fluid with the amount of sumping thereafter gradually decreasing so as to provide a gradual increase in the pressurized fluid at the clutch 22 as illustrated in FIG. 3. During this time the coil spring 104 has been compressed and the piston 100 moves slowly to the right. When the fluid pressure at the clutch 22 reaches a value of about 800 kPa, the pressure at the end 114 of the bore 98 is great enough to cause the pin 108 to engage the inside of both of the pistons 100 and 102. When this occurs, the piston 100 moves to the right relatively rapidly due to the larger diameter of the piston 102 so that the fluid pressure at the clutch 22 rapidly increases to about 1210 kPa as illustrated in FIG. 3.

Figure 4:
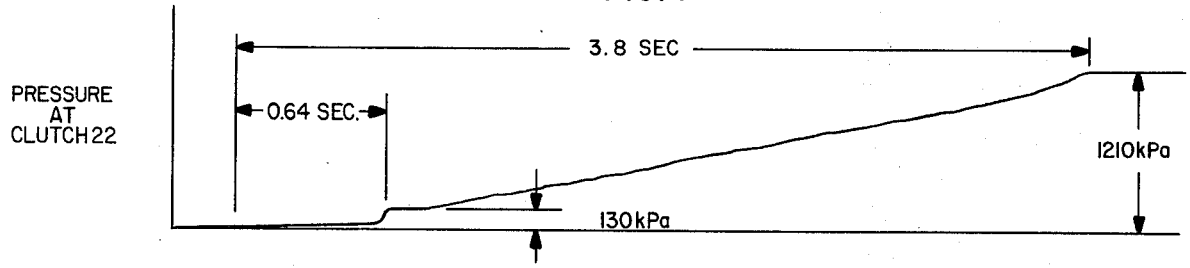
FIG. 4 is a diagrammatic plot of hydraulic fluid pressure in the clutch and in the brake as a function of time illustrating the case of slow engagement using the arrangement of FIG. 1.
Figure 4:
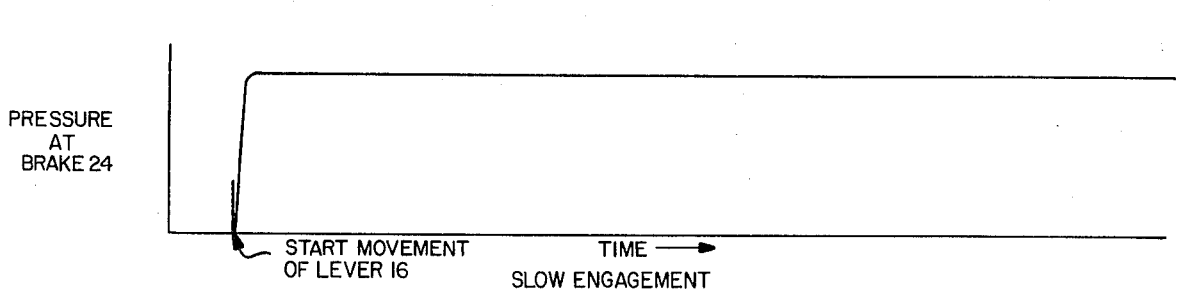

FIG. 4 depicts the situation in which the PTO control lever 16 is moved from the disengage position into the engage position relatively slowly. The resulting movement of the piston 32 is relatively slow, but results in release of the brake 24 prior to application of hydraulic fluid pressure to the clutch 22 because the groove 56 is located closer to the groove 48 than is the groove 60 to provide rapid release of the brake 24 as seen in FIG. 4. As movement of the control lever 16 toward the engage position is begun, the compression of the spring 30 within the modulating valve 34 becomes large enough to move the piston 32 to the right. This causes the fluid pressure at the clutch 22 to rapidly increase to about 130 kPa. Thereafter, the fluid pressure at the clutch 22 gradually increases from 130 kPa to a value of about 1210 kPa. In this example the maximum fluid pressure of 1210 kPa is reached approximately 3.8 seconds after movement of the PTO control lever 16 was first begun. Because the movement of the control lever 16 is slow enough, the relatively small amount of fluid pressure applied to the clutch 22 is passed via the orifice 118 to the end 114 of the bore 98 relatively quickly. As a result the pistons 100 undergo little if any movement while the piston 102 moves to the right as viewed in FIG. 1, and the pressurized fluid provided by the modulating valve 34 is applied directly to the clutch 22 as well as to the piston 102 through the orifice 118.

In addition to the recess 120, the bore 98 is provided with a recess 124 adjacent the lefthand end of the piston 100 and a recess 126 at a location between the pistons 100 and 102. The recesses 124 and 126 are respectively coupled to sumps 128 and 130. The purpose of the recesses 124 and 126 and the associated sumps 128 and 130 is to prevent pressure from building up in the space between the pistons 100 and 102. They allow fluid between the pistons to escape as the pistons 100 and 102 are moved toward each other. They also allow equalization of pressure when the pistons 100 and 102 are moved away from each other.

Occasionally during the operation of the tractor, it may be desirable to apply short shock loads of moderate severity to the power takeoff shaft via the clutch 22. This is possible in accordance with the clutch modulating system 10 of FIG. 1 by quickly moving the PTO control lever 16 out of the engage position and then quickly back into the engage position. As previously described, when the PTO control lever 16 has been in the engage position for a while, the pressures at the opposite ends 110 and 114 of the bore 98 of the trimmer valve 96 are substantially equal and the piston 100 has moved to the right so as to cut off the conduit 112 from the sump 122. If the PTO control lever 16 is now suddenly moved into the disengage position, the modulating valve 34 beings to move relatively quickly to the left as viewed in FIG. 1 to cut off the hydraulic fluid pressure in the main conduit 62. When this occurs the fluid pressure at the end 110 of the bore 98 decreases relatively rapidly. At the same time, however, the presence of the orifice 118 prevents rapid decrease of the pressure at the end 114 of the bore 98. If the PTO control lever 16 is then thrust quickly into the engage position, the modulating valve 34 again responds by quickly applying hydraulic fluid at or close to the pressure of the source 52 to the clutch 22. This pressure is quickly communicated to the piston 100. Because the pressure at the end 114 has not had enough time to dissipate through the orifice 118, however, the piston 100 cannot be moved quickly to the left. With the pin 108 engaging or close to the inside ends of both pistons 100 and 102, the piston 100 remains in a position which completely or substantially completely cuts off the sump 122 from the conduit 112. At the same time the application of full fluid pressure to the clutch 22 appears at the orifice 118 so as to maintain the end 114 of the bore 98 at the high pressure and prevent the valve 100 from being moved to the left. The resulting shock load to the clutch 22 and the associated power takeoff shaft is relatively short so as to provide the desired effect on the power takeoff shaft and any attached implements without posing any serious danger of damage to the clutch 22 and to the power takeoff system.

The shock effect will work when the PTO control lever 16 is in the fully engaged position or a partially engaged position and is quickly moved out of and then back into the engage position. When the PTO control lever 16 is moved into the disengage position for any length of time, the pressure at the end 114 of the bore 98 adjacent the piston 102 is rather quickly dissipated via the orifice 118. The various parts of the trimmer valve 96 therefore assume the positions shown in FIG. 1 in preparation for the next movement of the PTO control lever 16 into the engage position.

While the invention has been particularly shown and described with reference to a preferred embodiment thereof, it will be understood by those skilled in the art that various changes in form and details may be made therein without departing from the spirit and scope of the invention.

What is claimed is:

1. A system for modulating the application of fluid pressure to a clutch from a source of pressurized fluid comprising the combination of:
   a source of pressurized fluid;
   a first conduit coupled to a clutch;
   a control;
   means responsive to actuation of the control for coupling the source to the first conduit by a variable amount dependent on the position of the control;
   a sump for pressurized fluid;
   a second conduit coupled to the first conduit; and
   means for coupling the second conduit to the sump to an extent directly related to the rate of pressure increase of fluid in the second conduit.

2. The invention set forth in claim 1, wherein the means for coupling comprises a slidable valve arranged to vary the coupling between the second conduit and the sump in accordance with the position thereof and having a first end exposed to the pressure of fluid in the second conduit, a third conduit coupled between the second conduit and a second end of the valve opposite the first end, and a flow restriction in the third conduit.

3. The invention set forth in claim 2, wherein the valve is slidably disposed within a bore having a first end adjacent the first end of the valve and coupled to receive the second conduit, an opposite second end adjacent the second end of the valve and coupled to receive the third conduit and a recess therein disposed between the first and second ends of the bore and coupled to the sump.

4. The invention set forth in claim 3, wherein the valve is comprised of a first piston slidably disposed within the bore adjacent the first end of the bore, a second piston slidably disposed within the bore adjacent the second end of the bore, a spring extending between and contacting the first and second pistons within the bore and an elongated pin disposed between the first and second pistons within the spring.

5. A power takeoff clutch modulating system comprising:
   a power takeoff control lever;
   a power takeoff modulating valve mounted within a bore and slidable in response to movement of the power takeoff control lever;
   a source of pressurized hydraulic fluid;
   a first recess in the bore coupled to the source of pressurized hydraulic fluid;
   a second recess in the bore located adjacent and spaced apart from the first recess;
   a groove in the modulating valve adapted to couple the first recess to the second recess by increasingly greater amounts as the control lever is moved from a disengage position into an engage position;
   a first conduit coupling the second recess to a power takeoff clutch;
   a sump;
   a second conduit coupled to the first conduit; and
   a trimmer valve coupled between the sump and the second conduit and operative to couple the second conduit to the sump by an amount directly related to the rate of pressure increase of hydraulic fluid in the second conduit.

6. The invention set forth in claim 5, further including a third recess in the bore, the groove in the modulating valve being adapted to couple the first recess to the third recess by increasingly greater amounts as the control lever is moved from a disengage position into an engage position, and means for coupling the third recess to a power takeoff brake.

7. A power takeoff clutch modulating system comprising:
   a power takeoff control lever;
   a power takeoff modulating valve mounted within a bore and slidable in response to movement of the power takeoff control lever;
   a source of pressurized hydraulic fluid;
   a first recess in the bore coupled to the source of pressurized hydraulic fluid;
   a second recess in the bore located adjacent and spaced apart from the first recess;
   a groove in the modulating valve adapted to couple the first recess to the second recess when the control lever is moved into an engage position;
   a first conduit coupling the second recess to a power takeoff clutch;
   a sump;
   a second conduit coupled to the first conduit;
   a trimmer valve coupled between the sump and the second conduit and operative to couple the second conduit to the sump by an amount directly related to the rate of pressure increase of hydraulic fluid in the second conduit;
   third and fourth spaced-apart recesses in the bore;
   a third conduit coupling the first conduit to the third recess;

a second groove in the modulating valve adapted to couple the third recess to the fourth recess when the control lever is moved into an engage position;

a lock piston slidably disposed within a second bore and having opposite first and second ends, the first end of the lock piston being coupled to the control lever; and a fourth conduit coupling the fourth recess to the second bore adjacent the second end of the lock piston.

8. The invention set forth in claim 7, wherein the control lever includes a rotatably mounted crank having one end in contact with the first end of the lock piston and a second end in contact with the modulating valve.

9. The invention set forth in claim 8, wherein the second end of the crank has a plunger coupled thereto and the modulating valve comprises a piston slidably mounted within the first-mentioned bore and having an open end receiving the plunger, a coil spring disposed within the piston between the plunger and a closed end of the piston and a pin disposed within the coil spring.

10. The invention set forth in claim 5, wherein the trimmer valve comprises a second bore having a first end coupled to the second conduit and an opposite second end, a third conduit coupled between the second conduit and the second end of the bore and having a portion of reduced size therein, a first recess in the second bore disposed adjacent and spaced apart from the first end of the second bore and coupled to the sump, a first piston slidably disposed within the second bore adjacent the first end thereof, a second piston slidably disposed within the bore adjacent the second end thereof, a spring disposed within the bore and extending between the first and second pistons and a pin disposed within the spring and extending a substantial part of the distance between the insides of the first and second pistons.

11. The invention set forth in claim 10, further comprising a second recess in the second bore between the first and second pistons, a second sump coupled to the second recess and a ring disposed between the first piston and the spring.

* * * * *